(12) United States Patent
Ichikawa et al.

(10) Patent No.: US 6,266,310 B1
(45) Date of Patent: Jul. 24, 2001

(54) DISC PLAYER WITH GUIDE PLATE

(75) Inventors: Yoshihiro Ichikawa; Masamitsu Ohkawara, both of Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/323,851

(22) Filed: Jun. 2, 1999

(30) Foreign Application Priority Data

Jun. 10, 1998 (JP) .................................................. 10-162660

(51) Int. Cl.⁷ ........................... G11B 33/02; G11B 33/12
(52) U.S. Cl. .............................................................. 369/75.2
(58) Field of Search ................................ 369/75.1, 75.2, 369/77.2

(56) References Cited

U.S. PATENT DOCUMENTS 5,663,852   9/1997   Fujimori et al. .
5,831,958 * 11/1998   Kurita ................................ 369/77.2
6,118,618 * 9/2000   Kumakura ........................ 360/99.02

FOREIGN PATENT DOCUMENTS 0 571 227   11/1993   (EP) .

* cited by examiner

Primary Examiner—George J. Letscher
(74) Attorney, Agent, or Firm—Arent Fox Kintner Plotkin & Kahn, PLLC

(57) ABSTRACT

A disc player has a cartridge holder formed with an opening for loading a disc cartridge containing an optical disc through the opening. The disc cartridge has a slidingly opening shutter to expose an information recording surface of the optical disc contained in the cartridge, so as to permit information recording or reproducing. The disc player includes a disc cartridge loading system for transporting the disc cartridge in the same direction that the shutter moves on the disc cartridge. The disc player also includes a guide plate provided on the inner side of the opening within the disc player for guiding the disc cartridge when the disc cartridge is being transported into or out from the disc player through the opening. In particular, the guide plate has an inclined edge portion formed into a slope gradually inclined in an insertion and removal direction of the disc cartridge.

7 Claims, 12 Drawing Sheets

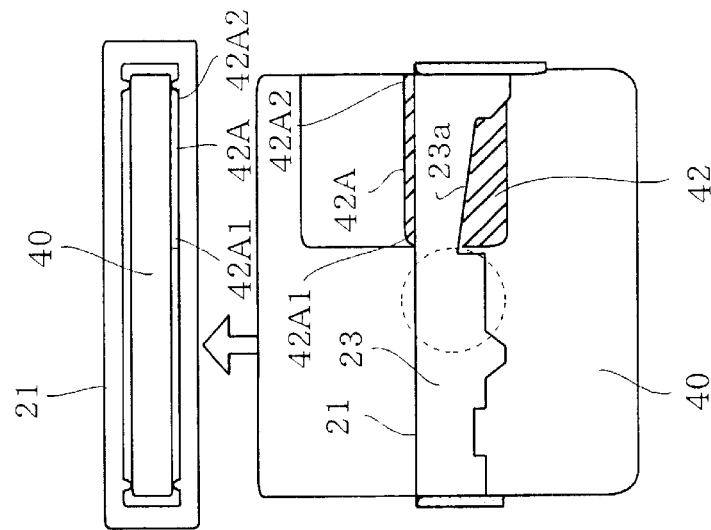
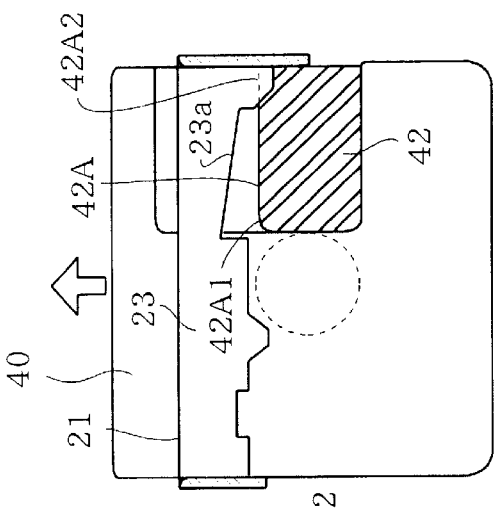
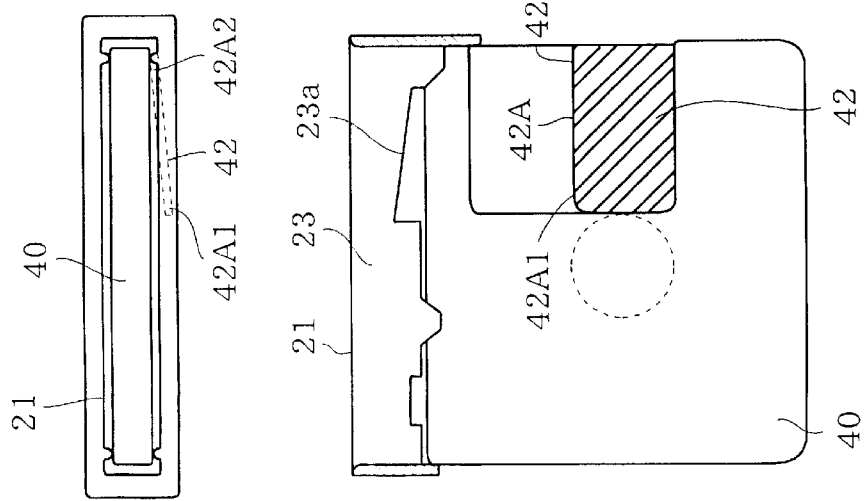
FIG.12A  FIG.12B  FIG.12C  FIG.12D  FIG.12E

DISC PLAYER WITH GUIDE PLATE

BACKGROUND OF THE INVENTION

The present invention relates to a disc player, in particular to a disc player capable of allowing a smooth insertion/removal of a disc cartridge containing an optical disc into/from the disc player.

There are many types of disc players for recording information into and reproducing information from an optical disc, with one example thereof illustrated in FIG. 15A. Referring to FIG. 15A, a conventional disc player A comprises a cartridge transporting means D for transporting the cartridge B to a predetermined position in a cartridge holder C located within the disc player A, a lift means F for moving down the cartridge holder C and clamping the sane onto a servo mechanism E for recording information into or reproducing information from the optical disc.

FIG. 15B shows another conventional disc player A'. As shown in FIG. 15B, this conventional disc player A' comprises a cartridge transporting means D for moving a disc cartridge B to a predetermined position in a cartridge holder C located within the disc player A', a pivoting means H for pivoting a servo mechanism E' about a pivoting axis G arranged perpendicular to the transporting direction of the cartridge B. The pivoting means H is adapted to clamp the servo mechanism E' to the cartridge holder C for recording information into or reproducing information from the optical disc. In fact almost all disc players in practical use at present time are manufactured in a manner as shown in FIG. 15B.

Each of the conventional disc players A and A' shown in FIGS. 15A and 15B has a cartridge holder C formed with an opening C1 on the front side thereof, as shown in FIG. 16. In this way, the cartridge B is allowed to be inserted into or taken out from the cartridge holder C through the opening C1.

Further, as shown in FIG. 16, a guide plate C2 is provided on the lower inner side of the opening C1, so as to serve as a guide means for ensuring a smooth insertion/removal of the disc cartridge B into/from the cartridge holder C.

However, with the disc players A and A' shown in FIGS. 15A and 15B, there may be listed the following problems.

Namely, a disc cartridge B has a shutter B1 (FIG. 17B) capable of slidingly opening/closing the cartridge B, thereby allowing an information recording surface of the optical disc to be exposed during a process of information recording/reproducing, but allowing the same to be completely covered within the cartridge B when not in a process of information recording/reproducing, so as to protect the information recording surface of the optical disc from an ambient outside environment.

However, since the shutter B1 of the cartridge B is usually formed by a sheet member having a small thickness, such shutter B1 is likely to be twisted or warped on one or both of its surfaces. Thus, when the cartridge B (with its shutter B1 deformed) is inserted into the disc player A or A', the deformed shutter B1 will bumper into the edge portions of the opening C1. As a result, there is a possibility that the cartridge B will fail to be inserted into the cartridge holder C.

On the other hand, if the shutter B1 of the cartridge B has been deformed due to some sort of acting force occurring within the cartridge holder C and such a cartridge B is to be removed from the cartridge holder C, the shutter B1 will bump against an edge portion C3 of the guide plate C2 (FIG. 16). As a result, it will be difficult or even impossible for the disc cartridge B to be removed from the cartridge holder C.

In order to solve the above problem, it has been suggested that a part (corresponding to a passage for the shutter B1 of the disc cartridge B to pass therethrough) of the opening C1 be made larger than other portions thereof, so as to ensure a necessary clearance for a disc cartridge B (with its shutter B1 deformed) to be inserted into or removed from the cartridge holder C, as shown in FIG. 7A.

However, if a part of the opening C1 is made larger than other portions thereof, the opening C1 will have an increased height and this will undesirably increase the size of an entire disc player, hence increasing the manufacturing cost.

SUMMARY OF THE INVENTION

It is an object of the present invention to provide an improved disc player capable of permitting a disc cartridge (with its shutter deformed) to be inserted into or removed from a cartridge holder, without having to increase the size of an opening of the cartridge holder, thereby ensuring a compact size for an entire disc player, so as to solve the above-mentioned problems peculiar to the above-mentioned prior arts.

According to the present invention, there is provided an improved disc player which has a cartridge holder formed with an opening, capable of loading through said opening a disc cartridge containing an optical disc, said disc cartridge having a shutter adapted to be slidingly opened to expose an information recording surface of the optical disc contained contained in the cartridge, so as to permit information recording or reproducing. The disc player comprises a disc cartridge loading system for transporting the disc cartridge in a direction which is the same direction for the shutter to move on the disc cartridge; a guide plate provided on the inner side of said opening within the disc player for guiding the disc cartridge when said disc cartridge is being transported into or from the disc player through the opening. In particular, the guide plate has an inclined edge portion formed into a slope gradually inclined in an insertion/removal direction of the disc cartridge into/from the disc player.

In one aspect of the present invention, said inclined edge portion is a linearly inclined portion or a curvically inclined portion.

In another aspect of the present invention, said inclined edge portion includes a plurality of smaller inclined portions having different inclining angles.

In a further aspect of the present invention, said inclined edge portion extends from a position close to an outer edge of the disc cartridge (being moved through the opening) to a position close to a center line in an insertion/removal direction of the disc cartridge, and has been formed into a slope gradually inclined in said insertion/removal direction.

In a still further aspect of the present invention, said inclined edge portion is provided on the guide plate close to the opening's center line in said insertion/removal direction of the disc cartridge.

The above objects and features of the present invention will become better understood from the following description with reference to the accompanying drawings.

BRIEF DESCRIPTION OF DRAWINGS

FIGS. 12A through 12E are explanatory view schematically indicating a removal process of a disc cartridge from the disc player made according to the present invention.

DETAILED DESCRIPTION OF THE PREFERRED EMBODIMENTS

FIGS. 1–4 are views showing a disc player made according to a preferred embodiment of the present invention.

Figure 1:
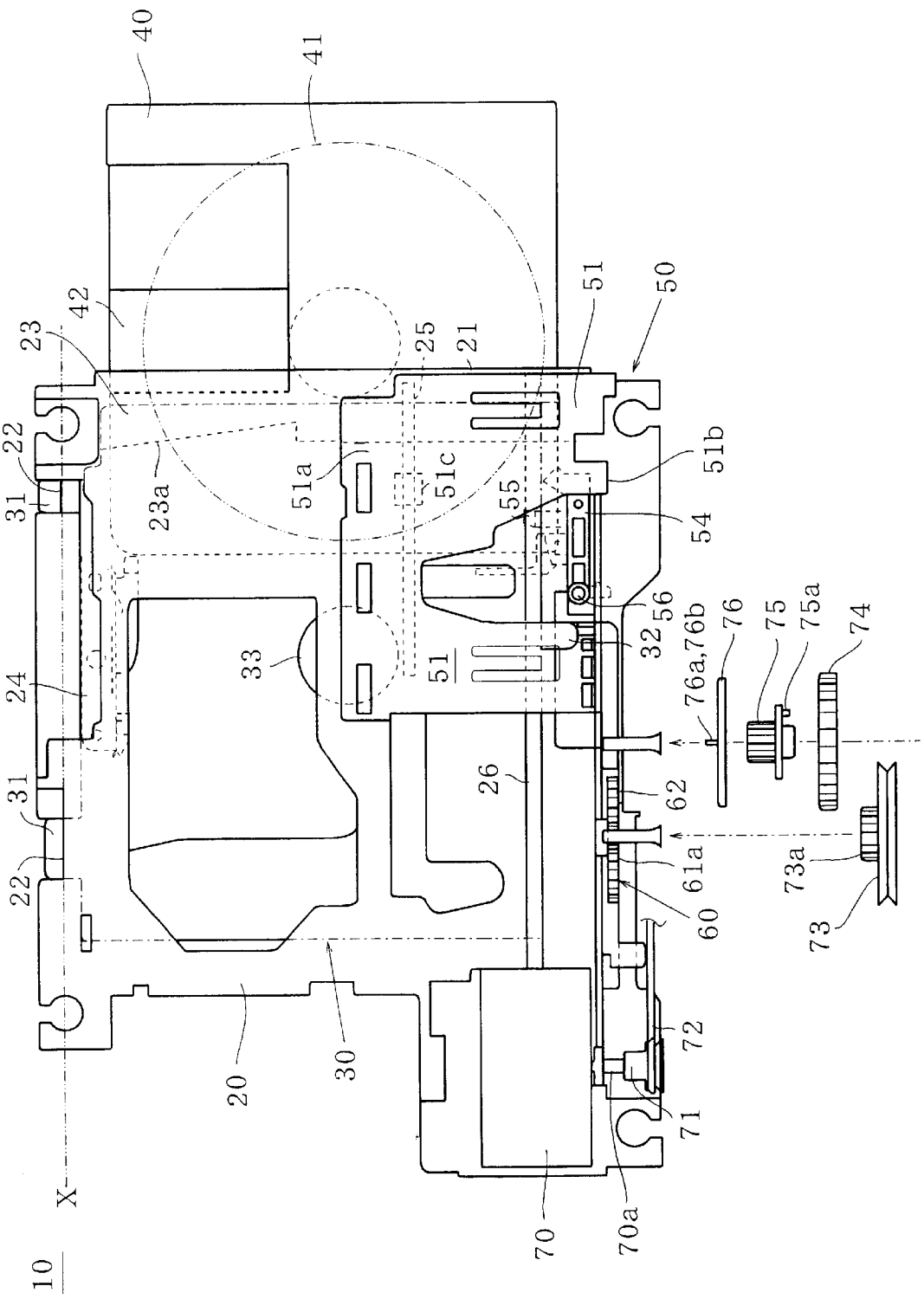
FIG. 1 is a front view schematically indicating a disc player lade according to a preferred embodiment of the present invention.

In FIG. 1, reference numeral 10 is used to represent a disc player which has a cartridge holder 20 for receiving and holding a cartridge 40. A pivotable chassis 30 is provided within the cartridge holder 40 in a manner such that it is pivotable about a pseudo pivoting axis X extending along one side of the cartridge holder 20, as shown in FIG. 1. On the other side of the cartridge holder 20, there are provided a cartridge transporting system 50 for moving the cartridge 40, a driving system 60 for pivotably driving the pivoting chassis 30, a motor 70 for driving all of the above elements.

Figure 4:
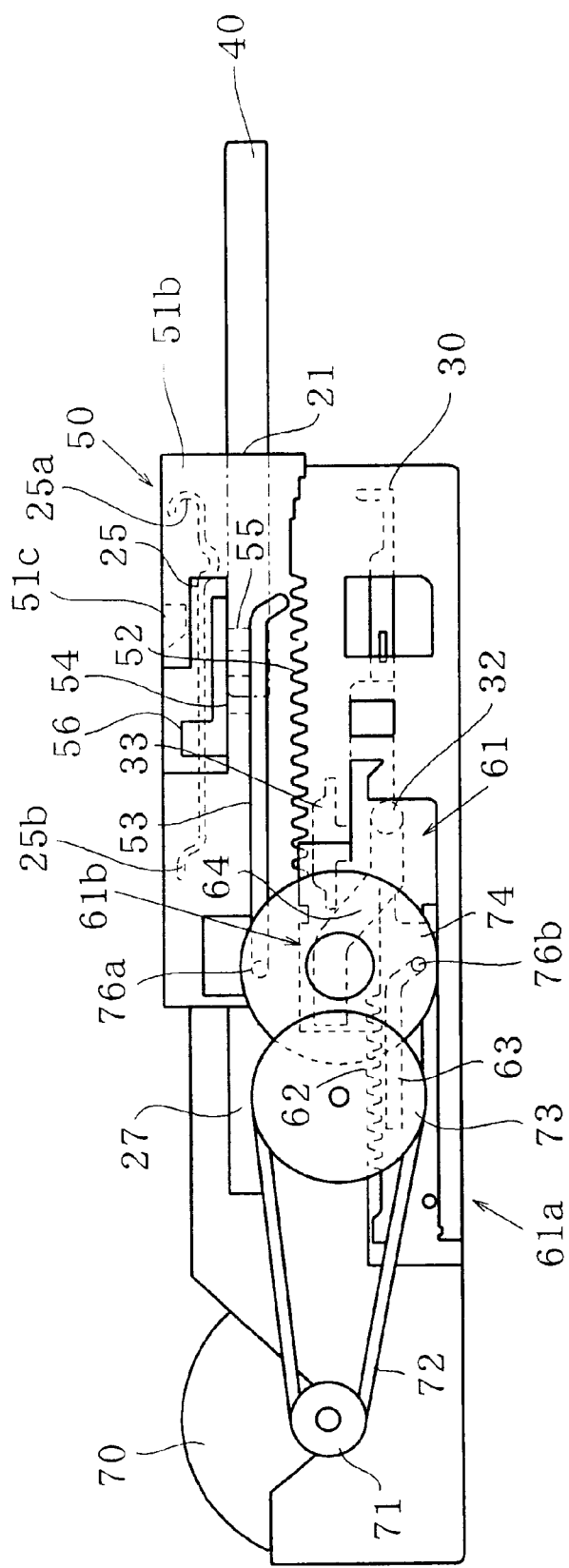
FIG. 4 is a side view schematically indicating the disc player of FIG. 1.

In detail, the cartridge holder 20 has a frame structure formed with an elongated opening 21 on the front side thereof (on the right side in FIG. 1 and FIG. 4). The cartridge 40 having a generally rectangular shape accommodating an optical disc 41, is allowed to be inserted into or taken out from the cartridge holder 20 through the elongated opening 21.

A protection shutter 42 is provided on the cartridge 40 adjacent to one side thereof, in a manner such that the shutter 42 can be slidingly driven in the sane direct ion as the cartridge is inserted into or removed from the cartridge holder 20.

Moreover, on the above one side of the cartridge holder 20 there are formed a plurality of retaining grooves 22 so that a plurality of hinge members 31 of the pivotable chassis 30 may be engaged in these grooves 22 and supported thereon. In this way, the pivotable chassis 30 is allowed to pivot about the pseudo pivoting axis X by virtue the hinge members 31.

Figure 2:
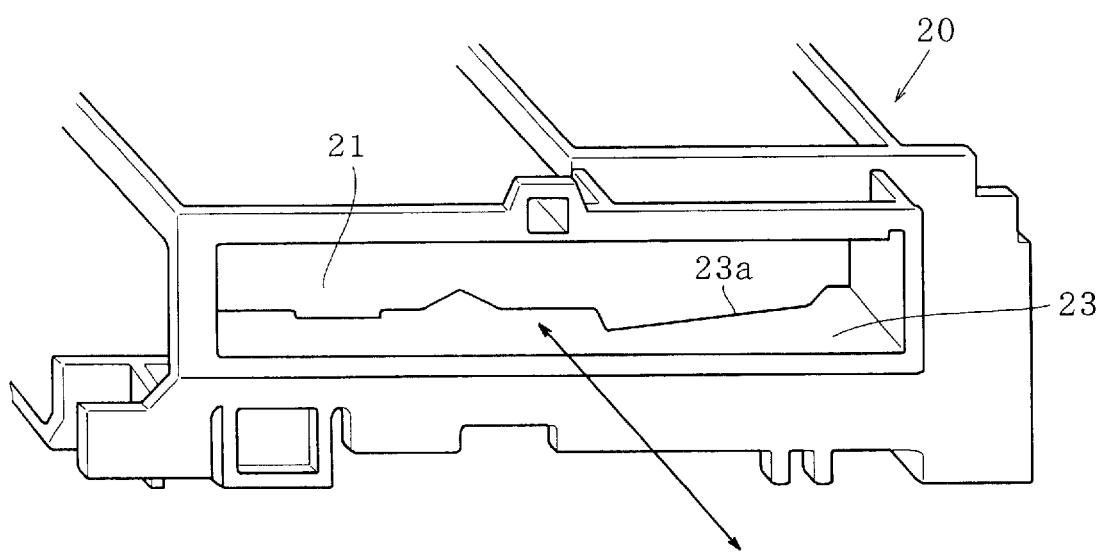
FIG. 2 is a perspective view schematically indicating a front portion of the disc player of FIG. 1.

FIG. 2 is a perspective view schematically indicating a front portion of the disc player of FIG. 1. As shown in FIG. 2, a guide plate 23 is provided on the lower inner side of the opening 21 to serve as a guide means for ensuring a smooth insertion/removal of the disc cartridge 40 into/from the cartridge holder 20.

Figure 14:
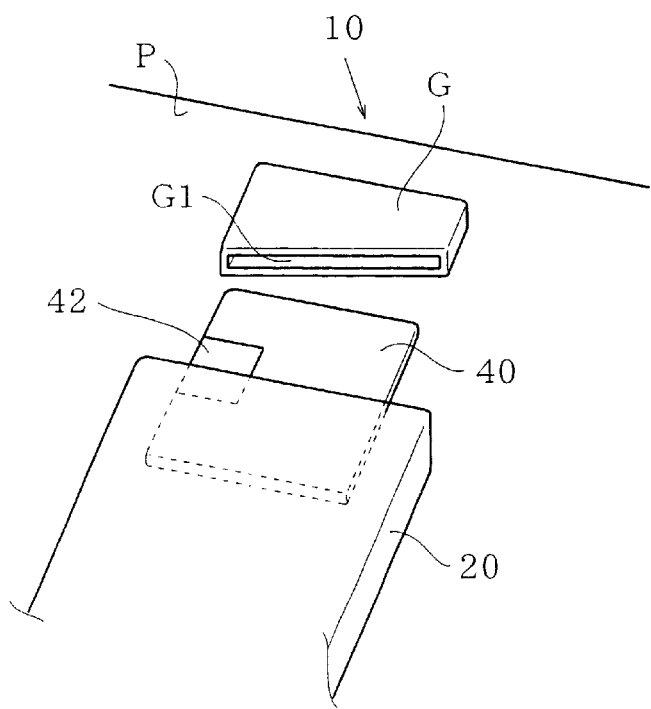
FIG. 14 is a perspective view schematically indicating a disc player made according to a further embodiment of the present invention.
Figure 15A:
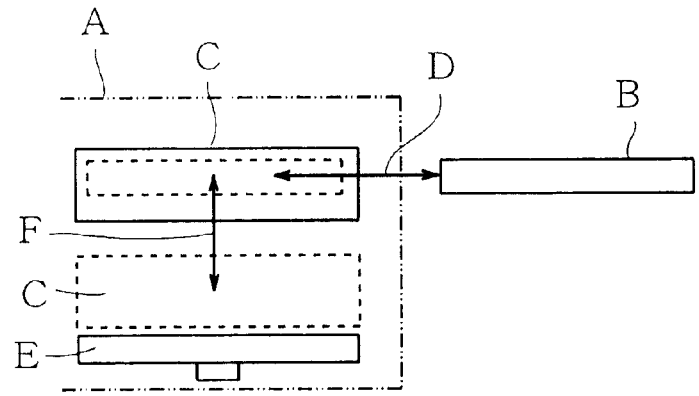
FIG. 15A is an explanatory view schematically illustrating a cartridge loading operation of a disc player made according to a prior art.
Figure 15B:
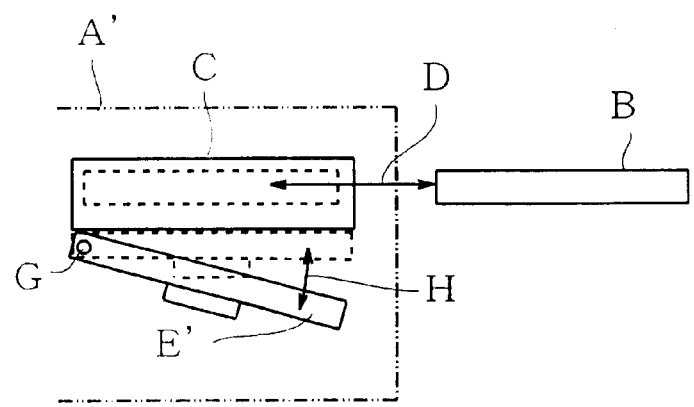
FIG. 15B is an explanatory view schematically illustrating a cartridge loading operation of a disc player made according to another prior art.
Figure 16:
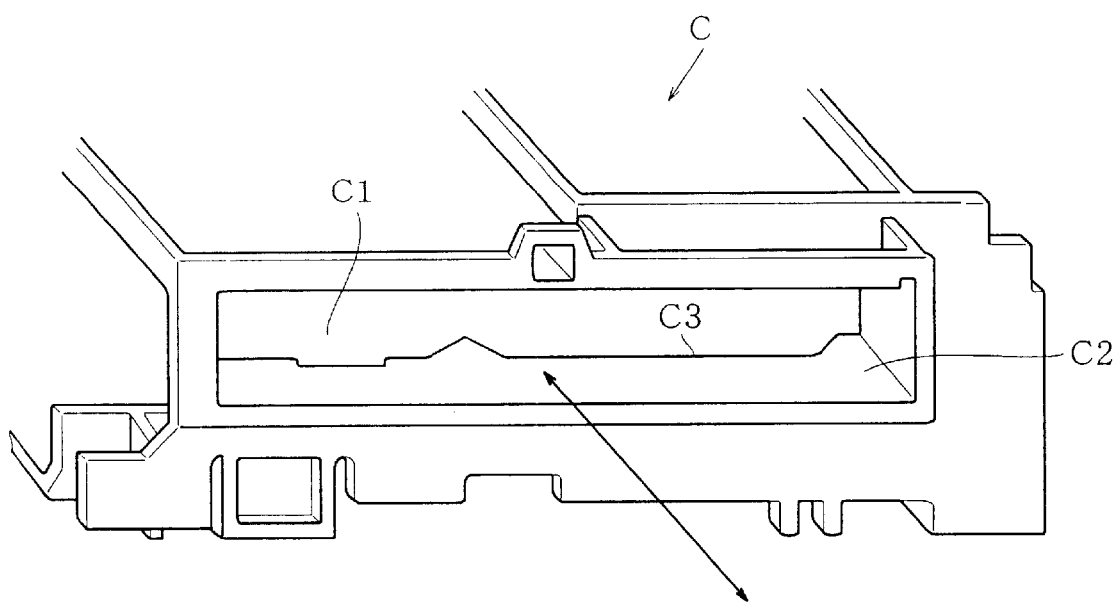
FIG. 16 is a perspective view schematically indicating a front portion of a disc player made according to a prior art.
Figure 17A:
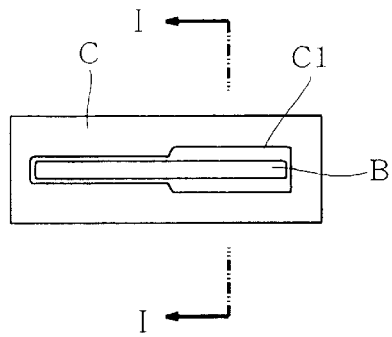
FIG. 17A is a front view schematically indicating an opening of a disc player made according to a prior art.
Figure 17B:
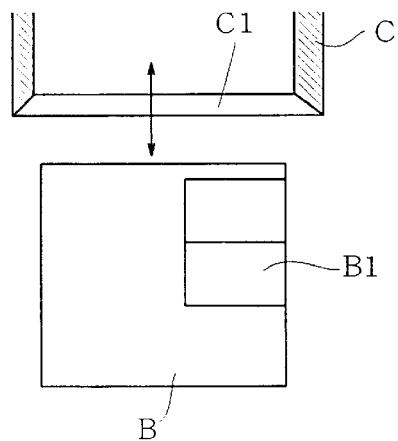
FIG. 17B is an explanatory view schematically indicating an operation for inserting/removing a disc cartridge into/from a disc player made according to a prior art.
Figure 17C:
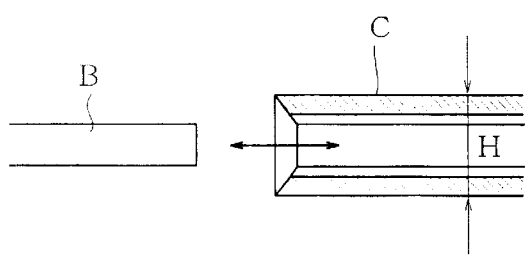
FIG. 17C is a side view schematically indicating an operation for inserting/removing a disc cartridge into/from a disc player made according to a prior art.

In detail the guide plate 23 has an inclined edge portion 23a which is formed in an inclined manner (inclined in the cartridge insertion/removal direction) such that its surface will not be perpendicular to cartridge insertion/removal direction. Alternatively, the guide plate 23 as whole may be formed into a slope surface so as to serve as a similar or more effective guide means. Further, it is also possible that other guide portions close to the opening 21 of the disc player may be similarly formed into inclined surfaces. For example, as shown in FIG. 14, an opening G1 of a guide section G provided on a panel P of the disc player 10 may be so formed that its entire edge portion is in an inclined loop configuration.

Referring again to FIG. 2, the inclined edge portion 23a of the guide plate 23 may present a linearly inclined surface or a curvicalty inclined surface. Further, the inclined edge portion 23a may also be formed to include several smaller inclined portions having different inclining angles.

In fact, an inclined edge portion like the portion 23a does not always have to be positioned on the guide plate 23 located on the lower side of the opening 23. Practically, it is possible that such an inclined edge portion 23a may also be located on other guide means located on other (upper, left or right) sections on the inner side of the opening 21, provided that it can guide the upper surface, upper and lower surfaces or right and left sides of the disc cartridge 40 when it is being moved through the opening 21.

Referring again to FIG. 1, a shutter sliding mechanism 24 is provided on one side of the cartridge holder 20 within the disc player 10, in a manner such that the shutter 42 of the cartridge 40 may be slidingly opened or closed in the insertion/removal direction thereof.

In more detail, the shutter sliding mechanism 24 includes a leaf spring formed by bending a flexible sheet member. In this way, one part of the shutter sliding mechanism 24 is allowed to insert into a guide groove formed on the disc cartridge 40, so that a spring (not shown, but provided to normally press the shutter 42 to have it in a closed position) of the cartridge 40 is pressed into the cartridge 40, thereby slidingly opening or closing the shutter 42.

Further, a clamping spring 25 is provided within the cartridge holder 20, in a manner such that it can cooperate with a projection 51c of a carrier 51 (which will be described later) to clamp an inserted cartridge 40 in a predetermined position within the cartridge holder 20.

Figure 3:
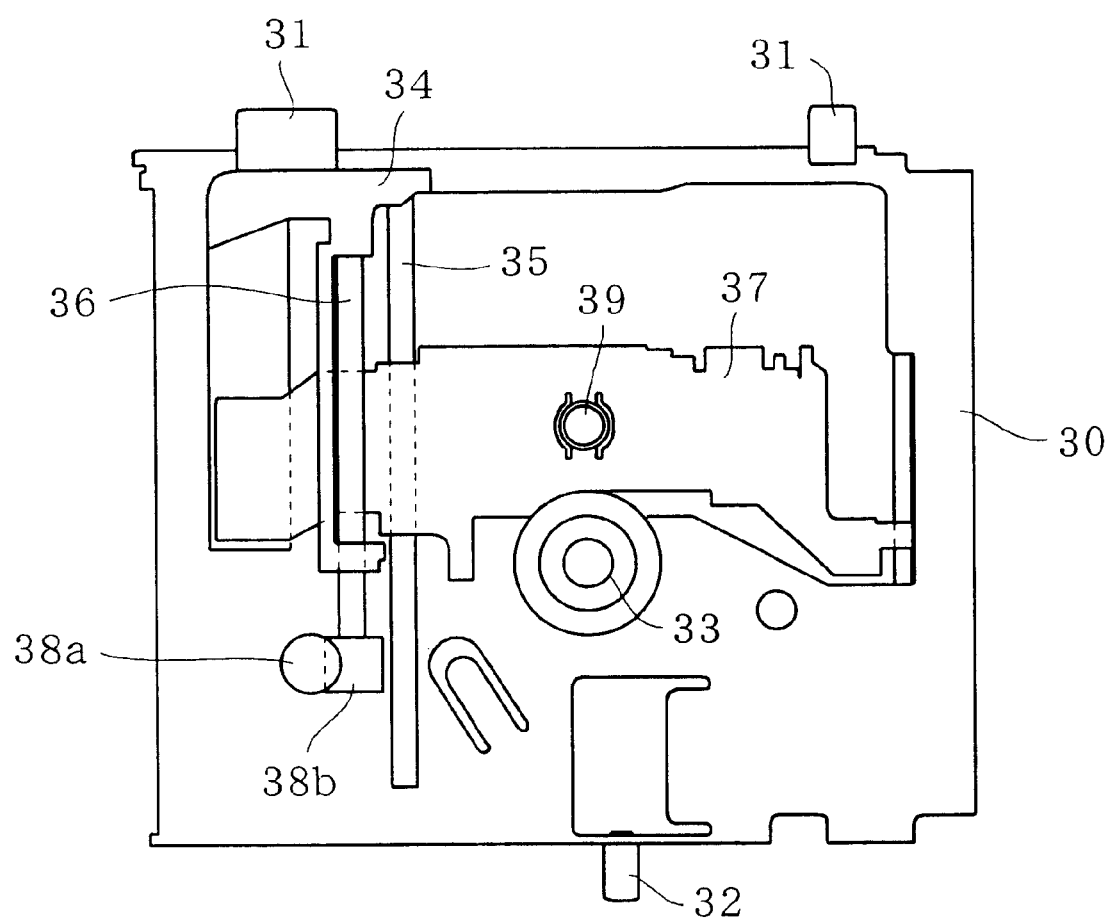
FIG. 3 is a front view schematically indicating a pivotable chassis used in the disc player of FIG. 1.

FIG. 3 is a front view schematically indicating the pivotable chassis used in the disc player of FIG. 1.

As shown in FIG. 3, the pivotable chassis 30 is also formed into a frame structure, a plurality of the hinge members 31 are outwardly protruding members integrally formed on one side of the pivotable chassis 30. With the hinge members 31 engaged in the retaining grooves 22 of the cartridge holder 20, the pivotable chassis 30 can pivot about the pseudo pivoting shaft X within the cartridge holder 20. On the other side of the pivotable chassis 30, there is provided an engaging pin 32 protruding outwardly in the same plane as defined by the chassis main body.

A turntable 33 for turning an optical disc 41 is provided on the center of the pivotable chassis 30. A supporting shaft 35 and a worm gear 36 are mutually parallelly arranged on the rear portion of the pivotable chassis 30 by means of a fixing member 34, extending from one side of the chassis 30 to the other. An optical pickup 37 is movably engaged through one side thereof with the worm gear 36 so as to be slidable on and along the supporting shaft 35. Further, a rotating gear 38a and an engaging gear 38b, which are in a mutually engaged condition, are provided on the pivotable chassis 30 near the worm gear 36 and the supporting shaft 35. A micro-type motor (not shown) provided on the chassis 30 is used to rotate the rotating gear 38a. With the rotation of the rotating gear 38a, the engaging gear 38b which is secured on one end of the worm gear 36, will be driven so that the optical pickup 37 may be moved reciprocatingly along the supporting shaft 35. In FIG. 2, a reference numeral 39 is used to represent an objective lens.

Further provided on the pivotable chassis 30 is a magnet head (not shown) which is movable up and down by virtue of a driving plate 61 (FIG. 4), as will be described in detail later.

Referring again to FIGS. 1 and 4, the cartridge transporting system 50 is used to move the cartridge 40 in a direction substantially parallel to the sliding direction of the shutter 42 on the cartridge 40. A carrier 51 is attached on the cartridge holder 20 so that it can move back and forth in the cartridge insertion/removal direction. By virtue of such carrier 51, the cartridge 40 is allowed to smoothly move into and out of the cartridge holder 20.

In detail, the carrier 51 comprises a base plate 51a (FIG. 1) and a side plate 51b (FIG. 4), forming an L-shaped configuration when viewed along the cartridge insertion direction. In fact, the carrier 51 is allowed to slide along an elongated groove 26 (FIG. 1) formed on the cartridge holder 20 extending in the cartridge insertion direction.

FIG. 4 is a side view of the disc player 10. As shown in FIG. 4, the side plate 51b is formed extending along one side face of the cartridge holder 20. Further, on the upper side of the side plate 51b there are provided a carrier locking means 54 and a carrier hooking means 55 (FIG. 13).

Figure 13:
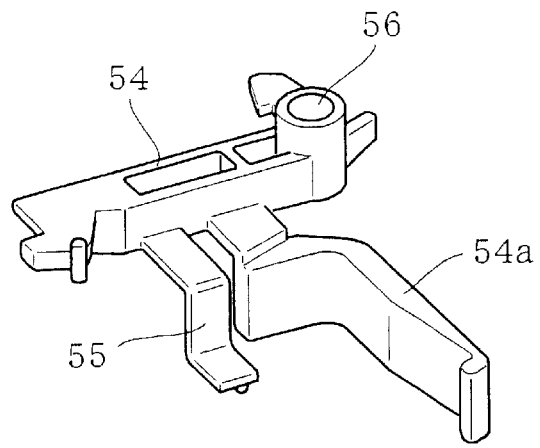
FIG. 13 is a perspective view schematically indicating a carrier blocking means used in the disc player of FIG. 1.

In FIG. 13, one end of the carrier locking means 54 is pivotable about a shaft 56 provided on the carrier 51, the other end thereof is normally urged in the clockwise direction by a spring (not shown) so that said other end can engage one side of the cartridge holder 20 to lock the carrier 51 in a predetermined position. With the use of such a structure, once the cartridge 40 is inserted into the cartridge holder 20, the front end of the cartridge 40 will press said other end of the carrier locking means 54 so that the carrier locking means 54 is pivoted about the shaft 56. In this way, a locked state between the carrier 51 and the cartridge holder 20 may be released so that the carrier 51 becomes movable in the cartridge insertion direction.

During the movement of the carrier 51 the carrier hooking means 55 will engage one side of the inserted cartridge 40, thereby enabling the cartridge 40 to move in a predetermined manner.

As shown in FIG. 13, the carrier hooking means 55 is provided on one side of the carrier locking means 54 and is made of an elastic material.

As show in FIG. 4, the side plate 51b of the carrier 51 is further formed with an elongated rack portion 52 in its longitudinal direction. Such rack portion 52 is allowed to engage with a driving gear 75 (FIG. 1) which will be explained in detail later.

Further, a guide groove 53 is formed in parallel with the elongated rack portion 52 on the side plate 51b, located between the elongated rack portion 52 and the above carrier locking means 54. As shown in FIG. 4, the guide groove 53 has a downwardly inclined front portion bending toward the rack portion 52. In detail, the guide groove 53 is so formed that it permits insertion of an upper pin 76a of a change-over ring 76 (FIGS. 1 and 4).

Referring again to FIGS. 1 and 4, on the same side of the cartridge holder 20, there is provided a driving plate 61 which is movable back and forth in the cartridge insertion direction, partially serving as a driving mechanism 60 for driving the above pivotable chassis 30.

In detail, the driving plate 61 includes a driving portion 61a and an operating portion 61b. The driving portion 6a is formed with a rack portion 62 engageable with a driving gear 75 which will be described in detail later.

Further, under the rack portion 62 is formed a guide groove 63 which is generally in parallel with the rack portion 62. The guide groove 63 also has a downwardly inclined front portion. Another pin 76b of the change-over ring 76 may be inserted in the guide groove 63.

On the inner surface of the operating portion 61b of the driving plate 61, there is formed a slightly Z-shaped guide groove 64. The engaging pin 32 of the pivotable chassis 30 is allowed to engage in the guide groove 64 so that said pin 32 may slide therealong. In this way, when the driving plate 61 is moving in its longitudinal direction, the pin 32 of the pivotable chassis 30 will be forced to move up and down in FIG. 4, thereby rendering the pivotable chassis 30 to pivot about the pseudo pivoting axis X (FIG. 1). Causing the chassis 30 to get in contact with or move away from a predetermined portion (not shown) within the cartridge holder 20.

In addition, a portion (not shown) of the driving plate 61 is so formed that it can serve to move the magnet head attached on the pivotable chassis 30.

Referring to FIGS. 1 and 4, a driving motor 70, which serves to provide a driving force for the chassis driving system 60 (for driving the pivotable chassis 30) and for the cartridge transporting system 50, is provided on the rear position of the cartridge holder 20.

Referring again to FIGS. 1 and 4, the motor 70 has a driving shaft 70a on which is secured a pulley 71. Another pulley 73 is secured on the side wall of the cartridge holder 20. A belt 72 is attached around both the pulley 71 and the pulley 73, so that a V-shaped belt contour is formed therebetween. Referring to FIG. 1, a small gear 73a integrally molded with the pulley 73 is engageable with a large gear 74 supported on the side wall of the cartridge holder 20.

Further, on the inner side of the large gear 74 is coaxially attached another gear 75 which is engageable with both the rack portion 52 formed on the side plate 51b of the carrier 51 and the rack portion 62 formed on the driving portion 61a of the driving plate 61. As shown in FIGS. 1 and 4, a change-over ring 76 having an upper pin 76a and a lower pin 76b is coaxially provided on the inner side of the gear 75.

In detail, the upper pin 76a of the change-over ring 76 is positioned such that it can be inserted in the guide groove 53 of the carrier 51, the lower pin 76b can be inserted in the guide groove 63 of the driving plate 61.

Formed on an inwardly recessed surface of the above gear 74 are two half-circumference grooves (not shown). The driving gear 75 is formed with a projection 75a which may movably engage in the half-circumference grooves and may be is stopped by end walls in each of such grooves.

A flexible clamping member 25 is attached on the cartridge holder 20, such that a cartridge 40 inserted in the cartridge holder 20 may be fixedly supported thereon.

The operation of the disc player 10 having the above-discussed structure made according to the present invention will be described in detail below with reference to FIGS. 4–11.

Referring to FIG. 4, when a cartridge 40 is begun to be loaded into the cartridge holder 20 of the disc player 10, the carrier 51 is in a position adjacent to the right end (as viewed in FIG. 4) of the cartridge holder 20, while the driving plate 61 is in a posit ion close to the left end (as viewed in FIG. 4) of the cartridge holder 20. At this time, the rack portion 52 of the carrier 51 is engaged with the driving gear 75, while the rack portion 62 of the driving plate 61 is not engaged with the driving gear 75.

At this moment, the upper pin 76a of the change-over ring 76 is in contact with the left end of the guide groove 53 of the carrier 51, while the lower pin 76b thereof is in contact with the lower end of the inclined portion of the guide groove 63 of the driving plate 61. In this way, the upper pin 76a and the lower pin 76b of the change-over ring 76 are contained in one pseudo line that is substantially perpendicular to the insertion direction of the cartridge 40, as shown in FIG. 4.

Once the cartridge 40 is inserted into the cartridge holder 20 through the elongated opening 21 formed on the front side thereof, the cartridge 40 will press a portion 54a (FIG. 13) of the carrier locking means 54, causing the carrier locking means 54 to pivot about the shaft 56. In this way, the locked state of the carrier 51 is released so that the carrier 51 becomes movable. Meanwhile, the hooking means 55 of the carrier 51 is caused to engage with an engaging hole formed on one side of the cartridge 40, so that the cartridge 40 and the carrier 51 become integrally movable.

At this time, even if the hooking means 55 fails to properly engage with the engaging hole formed on the cartridge 40, the hooking means 55 (since it is made of an elastic material) will be allowed to escape from the cartridge 40 so as to avoid a possible damage to the cartridge 40.

Referring again to FIG. 1, at this time, the carrier 51 is moved along the guide groove 26 to the rear (left) of the cartridge holder 20, and such a movement will cause a switch (not shown) to be turned ON, so as to cause the driving motor 70 to start its rotation.

Referring once more to FIG. 1, with the rotation of the driving motor 70, a driving force is transmitted through the pulley 71, the belt 72, the gear pulley 73, the small gear 73a, the large gear 74, thereby rendering the driving gear 75 to start its rotation.

Figure 5:
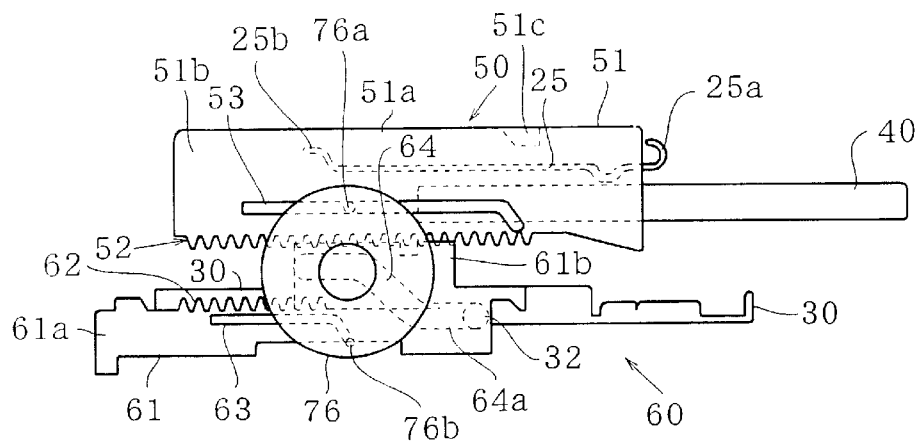
FIG. 5 is a side view schematically indicating a cartridge loading operation of the disc player of FIG. 1.

At this moment, referring to FIG. 5, since the upper pin 76a of the change-over ring 76 is still inserted in a horizontal portion of the guide groove 53 of the carrier 51, the change-over ring 76 does not rotate.

Figure 6:
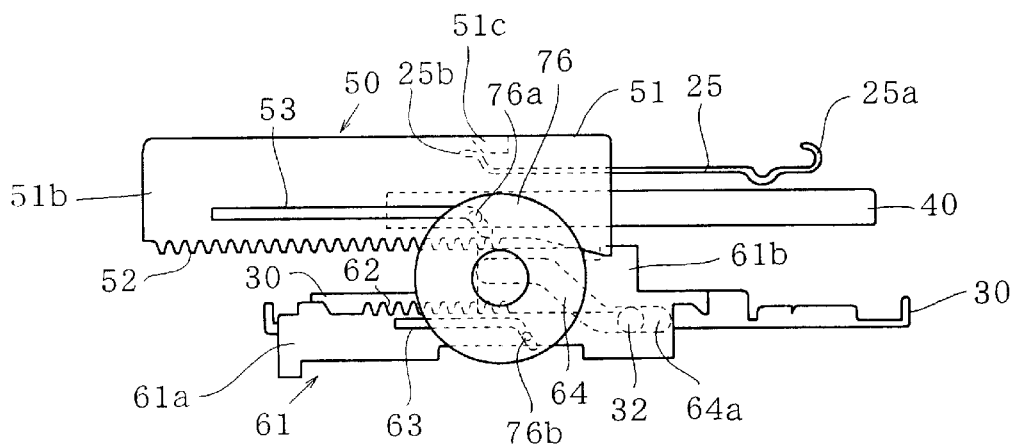
FIG. 6 is a side view schematically indicating a rack change-over operation of the disc play of FIG. 1.

However, when the carrier 51 moves towards the rear side of cartridge holder 20, the upper pin 76a of the change-over ring 76 begins to slid from the horizontal portion of the guide groove 53 to the inclined front portion thereof. When the upper pin 76a moves along the inclined portion of the guide grooves 53, the upper pin 76a is caused to move in a circular trace in the counterclockwise direction. Meanwhile, the lower pin 76b of the change-over ring 76 is also caused to move in a circular trace in the counter clockwise direction, thereby forming a circular movement of the change-over ring 76 in the counter clockwise direct ion. In this way, since the lower pin 76b is caused to press against the inclined portion of the guide groove 63, the driving plate 61 is forced to move rightwardly as shown in FIG. 6. In this way, the rack portion 62 of the driving plate 61 becomes engaged with the driving gear 75, thereby rendering the driving plate 61 to move also in the rightward direction.

When the change-over ring 76 is caused to rotate further in the counter clockwise direction, with the above movement of the upper pin 76a, the rack portion 52 (of the carrier 51) engaged with the driving gear 75 will be disengaged from the driving gear 75, thereby rendering the movement of the carrier 51 to stop. At this moment, the upper pin 76a is in contact with the rightmost end of the guide groove 53, and the cartridge 40 has thus arrived at a predetermined position within the cartridge holder 20.

Figure 7:
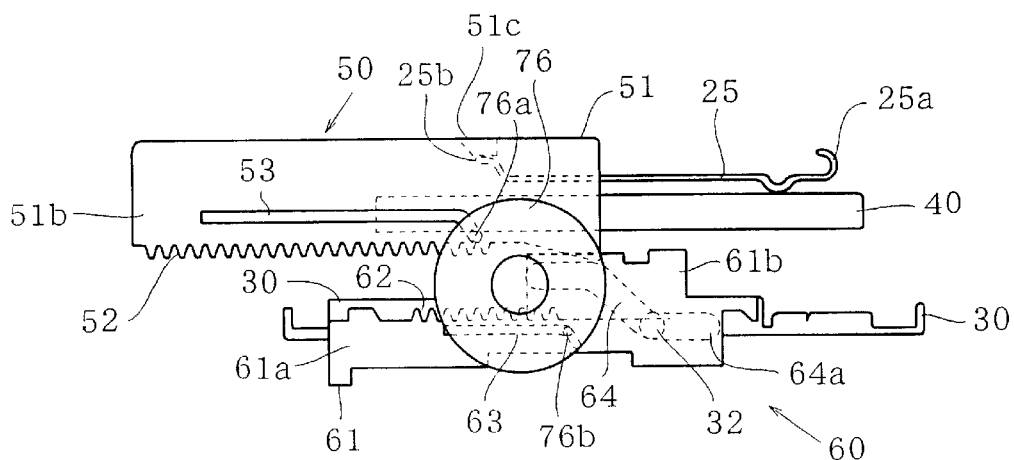
FIG. 7 is a side view schematically indicating a clamp starting operation of the disc player of FIG. 1.
Figure 8:
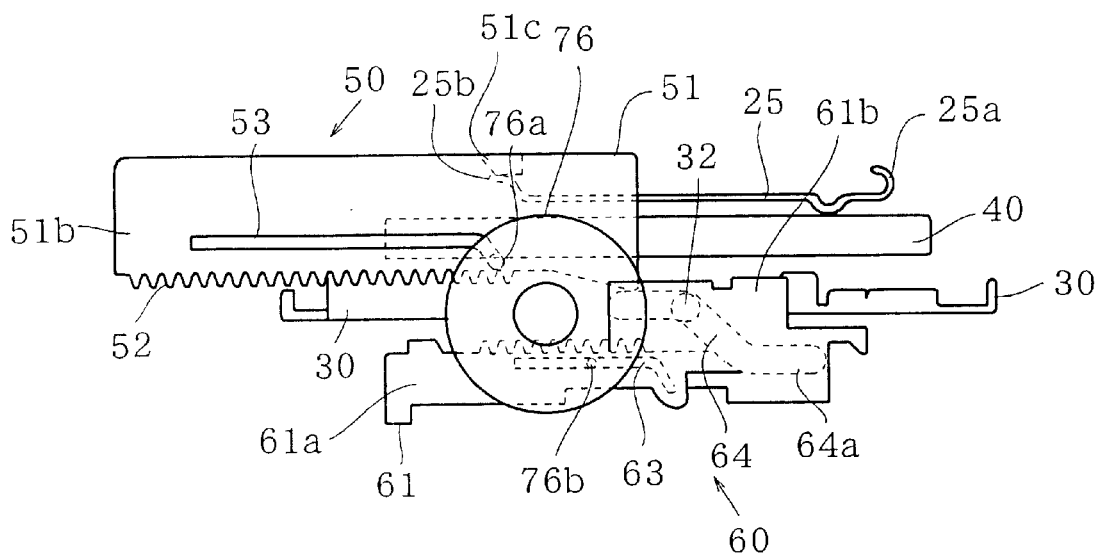
FIG. 8 is a side view schematically indicating a condition in which an optical disc is being reproduced.
Figure 9:
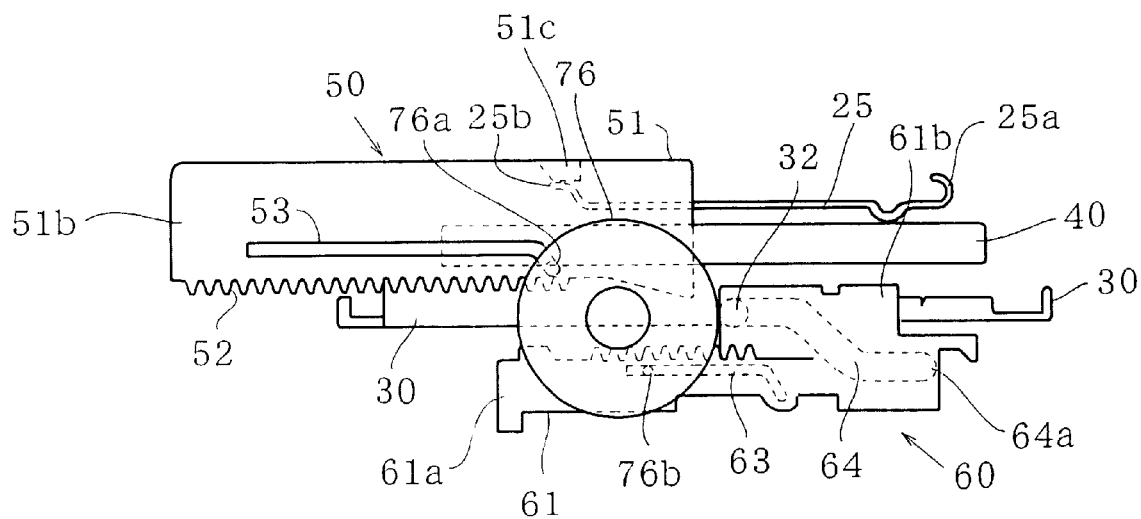
FIG. 9 is a side view schematically indicating a condition in which sound information is being recorded on an optical disc mounted within the disc player of FIG. 1.
Figure 10:
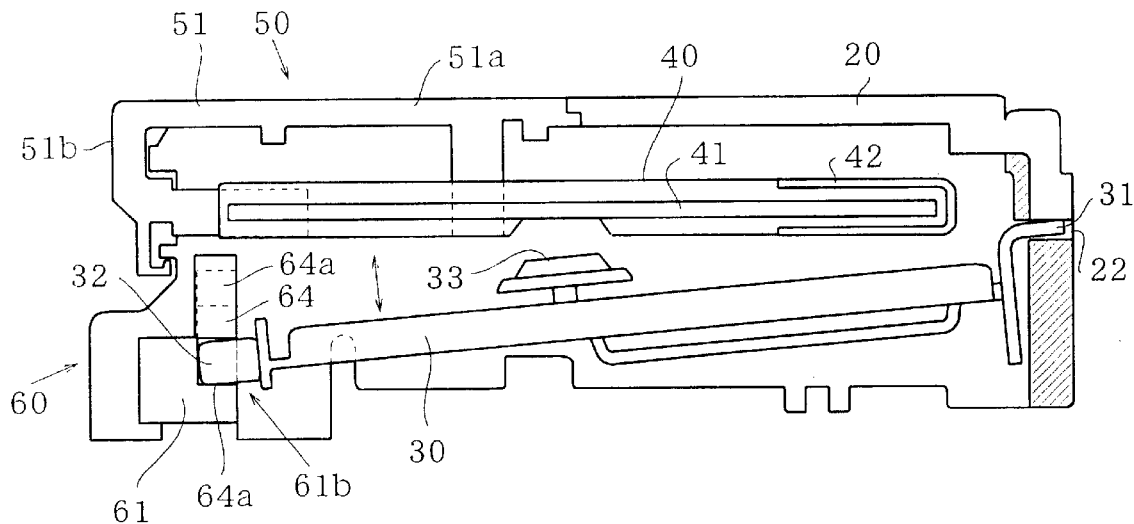
FIG. 10 is an explanatory view schematically illustrating a pivoting movement of the pivotable chassis provided in the disc player made according to the present invention.
Figure 11:
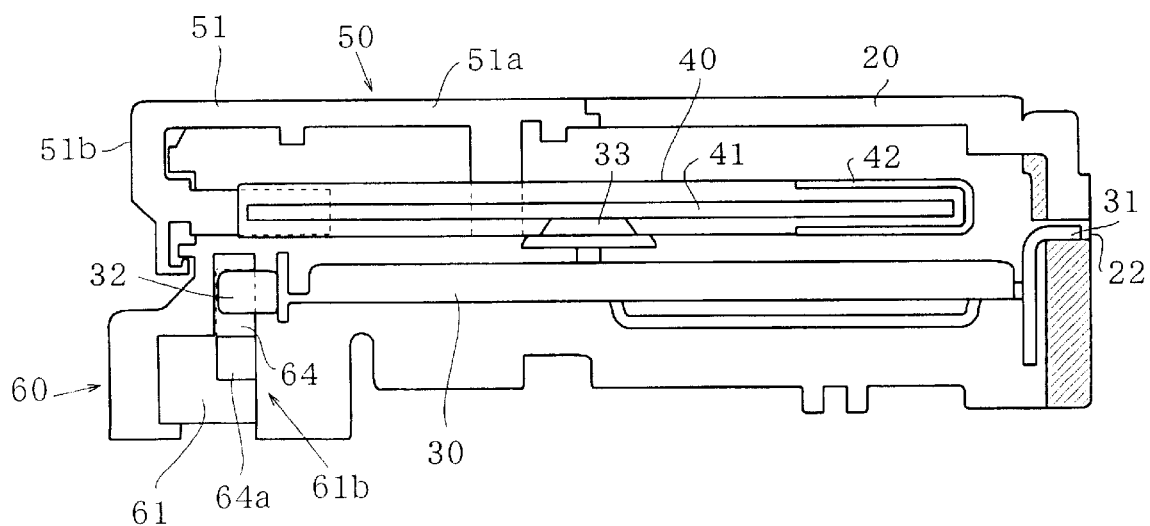
FIG. 11 is an explanatory view schematically illustrating a stopped position of the pivotable chassis provided in the disc player made according to the present invention.

Afterwards, since the driving plate 61 is further moved rightwardly, the engaging pin 32 of the pivotable chassis 30 is caused to move upwardly along the inclined groove 64 of the driving portion 61a of the driving plate 61, as shown in FIGS. 7–9. Accordingly, the pivotable chassis 30 is caused to pivot with the supporting grooves 22 of the cartridge holder 20 as pivoting fulcrums. In this manner, the pivotable chassis 30 will pivot to an operating position within the cartridge holder 20 so as to catch the cartridge 40 which has already been inserted in the cartridge holder 20, as shown in FIGS. 10 and 11.

Then, a switch (not shown) is turned OFF so that the driving motor 70 is stopped, thereby stopping the driving plate 61. Afterwards, the optical disc 41 contained in the cartridge 40 may be reproduced. At this moment, the clamping member 25 acts to press against the cartridge 40. Meanwhile, one portion (not shown) of the cartridge holder 20 will be pressingly contacted by a part of the cartridge 40, so that the disc cartridge 40 will be exactly held in position within the cartridge holder 20.

When a sound information is to be recorded on the optical disc 41 contained within the cartridge 40, the driving motor 70 is again operated to cause the driving plate 61 to move further rightward. In this way, a non-illustrated portion of the driving plate 61 acts to move down the magnetic head on the pivotable chassis 30. This time, the shutter 42 of the cartridge 40 had already been slide opened (at the time the cartridge 40 was inserted into the cartridge holder 20) by means of a shutter opening means (not shown) provided on the cartridge holder 20, so that the magnetic head is allowed to be mounted on the disc 41, thereby effecting a predetermined recording.

On the other hand, when a cartridge 40 containing an optical disc 41 is to be removed from the cartridge holder 20, a cartridge detaching process is required to be carried out in the following procedure that is not an exactly reversed course of the above cartridge insertion process.

At first, a stop button (not shown) of the disc player 10 is pushed so as to stop the reproducing or recording process being performed on the optical disc 41. Then, by operating an eject button, the driving motor 70 is caused to rotate in a reversed direction, so that the driving plate 61 is moved leftwardly in the drawings. Upon such operation, the pivotable chassis 30 begins to move downwardly, so as to move away from the operating position in the cartridge holder 20.

In this way, when the driving plate 61 moves, the lower pin 76b of the change-over ring 76 will be guided to slide downwrdly along a groove 63 from its horizontal portion to its inclined portion. Further, while the lower pin 76b is being guided by the inclined portion of the groove 63, the lower pin 76b will begin to move along a circular trace in a clockwise direction. In this manner, since the lower pin 76b of the change-over ring 76 is moved a along a circular trace in the clockwise direction, the change-over ring 76 itself will also be caused to rotate somehow in the clockwise direction, thereby enabling the driving gear 75 to engage back with the rack portion 52 of the carrier 51, and causing the rack portion 62 of the driving plate 61 to disengage from the driving gear 75, thus causing the carrier 51 to move toward right side of the cartridge holder 20. After that, the cartridge 40 is allowed to be removed from the cartridge holder 20 through the elongated opening 21, while the carrier 51 is stopped by the carrier locking means 54 so as to be retained on the cartridge holder 20.

In the following, an operation of the inclined edge portion 23a of the guide plate 23 of the disc player 10 will be described in detail with reference to FIGS. 12A–12E.

FIG. 12A is a plane view schematically indicating an operation in which a disc cartridge 40 is being removed from the cartridge holder 20 of the disc player 10 through the opening 21. FIG. 12B is a front view schematically indicating such an operation.

Here, the inclined edge portion 23a presents a linearly inclined surface which is provided in a position on the guide plate 23 close to a center line (said center line is arranged in the cartridge insertion/removal direction) of the cartridge 40 when being moved through the opening 21. As related earlier in this specification, the inclined edge portion 23a may also be formed into a curvically inclined surface, or alternatively, it may be formed by several smaller inclined edge portions.

FIG. 12C is a plane view schematically indicating an operation in which the cartridge 40 is being removed from the cartridge holder 20 of the disc player 10 through the opening 21. In fact, the cartridge 40 is moved in the same direction in which the carrier 51 moves, as indicated by an arrow shown in FIG. 12C.

Referring again to FIG. 12C, with the cartridge 40 moving further from the cartridge holder 20, a linear portion 42A of the shutter 42 of the cartridge 40 tends to get closer to and bump against the guide plate 23. However, since the guide plate 23 has an inclined edge portion 23a, there would be no direct contact between the linear portion 42A and the guide plate 23, what occurs is only a sliding contact between the two, which is caused by a sliding movement extending from a base end 42A2 of the linear portion 42A of the shutter 42 to a free end 42A1 of the linear portion 42A. In this way, the shutter 42 (if it has warped due to an external force, such as a hatched portion on the shutter 42, particularly the free end 42A1 wilt easily warped) may be corrected in its configuration upon passing through the inclined edge portion 23a.

Since there is not any direct contact between the linear portion 42A (of the shutter 42) and the guide plate 23, a warped portion (such as the free end 42A1 of the linear portion 42A of the shutter 42) of the cartridge 40 is allowed to pass through the inclined edge portion 23a, thereby allowing the cartridge 40 to smoothly move through the opening 21 in a sliding contact with the guide plate 23, as shown in FIG. 12D and FIG. 12E.

Upon removal of the cartridge 40 from the opening 21 of the cartridge holder 20, the carrier 51 will be caught on the cartridge holder 20 by virtue of the carrier locking means 54, thereby finishing a series of operations for removing the disc cartridge 40 out of the disc player 10.

As understood from the above description, with the use of the inclined edge portion 23a, a slightly deformed shutter 42 of the disc cartridge 40 may be corrected in its configuration when passing through the inclined edge portion 23a of the guide plate 23, thereby allowing the cartridge 40 to smoothly move through the opening 21 in a sliding contact with the guide plate 23, thus ensuring a smooth movement for inserting/removing a disc cartridge into/from a disc player, without a necessity of providing an additional space near the opening 21 in the disc player for such movement of the disc cartridge.

Therefore, with the use of the present invention, it is allowed to provide an improved disc player capable of permitting a disc cartridge (with its shutter deformed) to be inserted into and removed from a cartridge holder, without having to increase the size of an opening of the cartridge holder, thereby ensuring a compact size for an entire disc player.

While the presently preferred embodiments of the this invent ion have been shown and described above, it is to be understood that these disclosures are for the purpose of illustration and that various changes and modifications may be made without departing from the scope of the invention as set forth in the appended claims.

What is claimed is:

1. A disc player having a cartridge holder, said cartridge holder formed with an opening for loading through said opening a disc cartridge containing a disc, said disc cartridge having a slidingly opening shutter to expose an information recording surface of the disc contained in the cartridge, so as to permit information recording or reproducing, said disc player comprising:

a disc cartridge loading system for transporting the disc cartridge in a direction which is the same direction for the shutter to move on the disc cartridge;

a guide plate provided on an inner side of said opening within the disc player for guiding the disc cartridge when said disc cartridge is being transported into and out from the disc player through the opening;

wherein the guide plate has an inclined edge portion formed into a slope gradually inclined in a plane parallel to a plane in which the disc cartridge is inserted into and removed from the disc player, in a manner such that the inclined edge portion of the guide plate slightly contacts the shutter of the disc cartridge so as to ensure a smooth passing of the disc cartridge through the opening of the cartridge holder.

2. The disc player according to claim 1, wherein said inclined edge portion is a linearly inclined portion.

3. The disc player according to claim 1, wherein said inclined edge portion is a curvically inclined portion.

4. The disc player according to claim 1, wherein said inclined edge portion includes a plurality of smaller inclined portions having different inclining angles.

5. The disc player according to claim 1, wherein said inclined edge portion extends from a position close to an outer edge of the disc cartridge to a position close to a center line in an insertion and removal direction of the disc cartridge, and is formed into a slope gradually inclined in said insertion and removal direction.

6. The disc player according to claim 1, wherein said inclined edge portion is provided on the guide plate close to a center line of the opening in said insertion and removal direction of the disc cartridge.

7. The disc player according to claim 1, wherein the guide plate is disposed along the longitudinal direction of the opening.

* * * * *